2,751,333

REFORMING CATALYST AND PROCESS

Heinz Heinemann, Swarthmore, Pa., assignor to Houdry Process Corporation, Wilmington, Del., a corporation of Delaware No Drawing. Application June 20, 1951,
Serial No. 232,661

13 Claims. (Cl. 196—50)

The present invention relates to the reforming of gasoline and naphtha fractions under pressure and in the presence of dehydrogenation catalysts. An important aspect of the invention involves preparation and use of novel catalysts of high selectivity effecting desired upgrading of the naphtha charge stock by processes including modification of hydrocarbon components of the charge including any or all of the following: dehydroisomerization of alkylcyclopentanes and dehydrogenation of cyclohexane and its homologues to produce aromatic compounds, as well as the transformation of normal paraffins, particularly normal heptane and its higher homologues, to corresponding branch chain hydrocarbons. The invention includes treatment of individual or selected mixtures of such hydrocarbons for effecting such isomerization and dehydroisomerization.

Five membered naphthene ring hydrocarbons are found in fairly high concentration in virgin light naphtha fractions as well as in naphtha fractions from thermal non-catalytic and hydrogenative-catalytic cracking. Such naphtha fractions also contain hydroaromatic naphthenes in greater or less amount depending upon the particular source of the naphtha. These hydroaromatic naphthenes, for instance cyclohexane and methyl-cyclohexane, can be readily and rapidly converted to the corresponding aromatic compounds such as benzene and toluene respectively, by ordinary dehydrogenation in the presence of the usual dehydrogenation catalyst (such as chrome-alumina) and with accompanying production of only insignificant quantities of carbonaceous deposit.

When five membered naphthene ring compounds such as methylcyclopentane, are subjected to dehydrogenation with these ordinary dehydrogenation catalysts under like conditions, cyclic monoolefins and diolefins are formed accompanied by the production of relatively large quantities of hydrocarbonaceous deposit, evidently resulting from side reactions including dehydrocondensation of cyclic olefin polymers. Because of the presence of a teritary carbon structure, moreover, alkyl cyclopentanes are particularly susceptible to cracking with a tendency to rupture the naphthene ring.

Because of these inherent difficulties, it has been the previous practice in producing aromatic hydrocarbon compounds from five membered naphthene ring hydrocarbons, first to isomerize such compounds to cyclohexane and its homologues under selected isomerizing conditions and employing isomerization catalysts such as typically aluminum chloride; followed by dehydrogenation of the cyclohexane rings.

In a copending application Serial No. 198,468, filed November 30, 1950, certain hydrocarbon reforming processes are described wherein high yields of gasoline of enhanced octane quality are obtained while minimizing the course or extent of accompanying side reactions, such as cracking, which tend to produce coke and low molecular weight hydrocarbon gases at the expense of desired gasoline yields. In accordance with the disclosure of that application, selective conversion of naphthenes to aromatics is effected in the presence of catalysts having desired activity in promoting dehydrogenation reactions and having little or no initial or potential tendency to promote cracking or polymerization reactions. The described catalysts include metals and oxides effective as catalysts in promoting dehydrogenation supported on carriers which have no significant cracking activity; among which are included: noble metals of the platinum-palladium group supported on non-acidic carriers such as magnesia; and molybdenum oxide supported on inactive or inactivated carriers, such as on alumina which has been specially treated to inactivate the cracking-promoting function thereof. Among the inactivated alumina carriers disclosed, there are included such supports prepared by treating activated or gamma-alumina with an alkaline earth metal compound effecting deposition of 0.1–2% by weight of an alkaline earth oxide, preferably magnesia, in the carrier.

In a copending application Serial No. 226,744, filed May 16, 1951, certain processes for upgrading of gasoline and naphtha fractions involving isomerization and dehydrogenation are described employing a noble metal catalyst distributed in a support consisting essentially of acid-treated alumina.

The present invention is based on the discovery that catalyst prepared by deposition of a small amount of a noble metal on an alumina base containing boria has improved activity and/or selectivity, in the promotion of the conversion processes involved in reforming and transformation of hydrocarbons of the type contained in gasoline and naphtha fractions.

In accordance with the present invention a gasoline or naphtha fraction, or one or more individual components of such a fraction, is contacted with a catalyst comprising a noble metal of the platinum-palladium group in small amount supported on an acid-treated alumina carrier which has been impregnated with a minor amount of boria. Such catalytic contact is effected at temperatures in the range approximately of about 850–1000° F., in the presence of added or recycled hydrogen and under a total pressure of 100–1000 pounds per square inch. As a result of such operation, alkylated five membered naphthene ring compounds are converted to aromatic hydrocarbons, normal paraffins are isomerized to corresponding branch chain compounds, and hydroaromatic compounds are dehydrogenated to the corresponding aromatics. These reactions take place, moreover, without accompanying cracking of the naphthenes to any significant extent and with only relatively small production of fixed gas and coke.

The preparation of the catalyst is relatively simple. Alumina gel having a sufficiently porous and heat stable structure, such as the familiar activated alumina of commerce, is washed with mild or dilute acidic solution at ordinary or room temperature, employing one of the stronger of the organic carboxylic acids or mineral acids, or an aqueous solution of a hydrolyzable acid-reacting salt. The acid should be one having an ionization constant (primary) no less than that of acetic acid (which is $1.86 \times 10^{-5}$); or in the case of a hydrolyzable salt the anion must be one furnishing acid of such strength. The acid or acid salt, moreover, must be one which does not leave a detrimental residue in the catalyst incapable of being removed by simple water washing or other corresponding uncomplicated treatment.

Among the organic carboxylic acids, tartaric acid and particularly acetic acid are preferred. Inorganic treating solutions include ammonium chloride and organic base chlorides, hydrohalogen acids, particularly hydrochloric. In the use of the latter, care should be taken to remove substantially all of the halide ion by washing or otherwise, since the presence of halogen in the catalyst may tend to promote increased cracking of the charge. The use of fluoride-containing acids and salts is ordinarily best avoided, since the fluoride ion tends to form insoluble complexes with alumina or with other components of the catalyst which cannot be readily removed by water washing. The acids are usually employed in dilute form as in concentrations of about 5-15% generally, or concentrations as low as one or two percent can be used in the case of mineral acids; concentrated carboxylic acids can be employed, if desired. The quantity and concentration of acidic solution ordinarily is such that under the treating conditions not more than 10% and preferably not more than about 5% of the alumina is leached out thereby.

Following acid treatment, the alumina is generally washed with water to remove soluble materials and dried, the extent of the water washing depending upon whether or not it is necessary to wash the product free of the anion of the particular acid or acid-reacting salt employed. The dried alumina is then calcined to remove combined water and volatiles and thereafter impregnated with the boria. Thus the alumina is dipped into an aqueous solution of boric acid which contains from at least about 2% $H_3BO_3$ up to a saturated solution thereof, at room temperature or above, for one or more hours. The treated pellets are then dried and again heat-treated prior to impregnation with the noble metal. The quantity of boria incorporated may be from about 0.1% to 5% by weight of the catalyst.

Impregnation with the noble metal is effected by dipping the boric acid-treated alumina in an equeous solution of a decomposable compound of the noble metal of sufficient concentration to provide the desired quantity of metal in the finished catalyst and then heated or otherwise treated to effect conversion of the metal compound to the free metal, or to an oxide thereof reducible to a free metal. Suitable treating solutions include, for example, aqueous solutions of chloroplatinic and chloropalladic acid of suitable concentration to deposit from about 0.05 to 2.0% by weight of the noble metal in the catalyst and preferably less than about 1.0% by weight thereof. Decomposition of the noble metal compound may be effected by treatment at elevated temperature in a reducing gas, such as hydrogen.

The alumina support employed may be in the form of irregular lumps or granules of desired size range, but is preferably in the form of bodies of more regular size and shape, such as spherical beads, or tablets or pellets of cylindrical or other shape. During the several heat-treating stages employed, it is desirable that the alumina be not subjected to temperatures sufficiently high to cause transformation thereof to beta forms of alumina.

The process of the invention is applicable to the treatment of naphthene-containing gasoline and naphtha fractions for improving the octane quality thereof for use as motor and aviation fuels as well as for the production of aromatics for use as solvents and chemical intermediates. Hydroaromatic hydrocarbons as well as alkyl cyclopentanes present in the charge are converted almost completely, as up to 90% of the total thereof or more, to benzene and its homologues, accounting at least in part for the remarkable increase in octane values. Not only are normal paraffins present in the charge isomerized, but paraffins having only a single branch, such as methyl and other alkyl paraffins, are converted to isomers having a larger number of side chains. While some cracking of heptane or other more readily split components of the charge does take place, with the consequent production of lower molecular weight hydrocarbons including $C_4$'s and dry gas, the catalysts of the invention are more selective than those previously known, in producing higher yields of the desired isomers, or in producing less cracking for the corresponding extent of isomerization effected. Coke formation in the process is quite low being generally in the order of less than about 0.05% by weight of the charge, so that the process can be operated continuously over comparatively long on-stream periods without necessitating reactivation or replacement of the catalyst.

The process of the invention is applicable not only to the reformation of virgin naphthas, but is particularly beneficial in the treatment of distillates derived from hydrogenative cracking, since such distillates are usually characterized by low octane quality, because of their relatively high ratio of normal to isoparaffins and/or high naphthene content.

Addition of extraneous hydrogen in the process will be required only in starting up the operation since hydrogen contained in the effluent may thereafter be recycled, such recycled gas being of a sufficiently high degree of purity for the purpose.

For purposes of effecting chiefly isomerization of normal heptane and its higher homologues, operating conditions including temperatures of from about 850° F. to 1000° F., preferably below the latter; pressures in the range of 100 to 1000 pounds per square inch, preferably from about 400 to 700 pounds; and space rates of from about 1 to 6 volumes of hydrocarbon charge per hour per volume of catalyst, preferably about 3 to 5 space rate. For effecting chiefly transformation of alkyl cyclopentanes to aromatics the same temperature range applies as well as the described space rates, however, lower operating pressure is indicated, as in the range of about 100 to 500 pounds per square inch, preferably from about 200 to 300 pounds. In the treatment of gasoline and naphtha fractions, which ordinarily will contain normal paraffins as well as alkyl cyclopentanes, conditions may be chosen from the ranges above described, consistent with the composition of the charge and the results desired.

EXAMPLE I

Commercial activated alumina pellets (Harshaw) were treated with 10% acetic acid solution for one hour, decanted, and the treatment repeated for another hour with fresh acid of the same concentration, an amount of acid being employed each time just sufficient to cover the pellets. The treated pellets were washed with water a number of times, dried at 200° F. and calcined in air at 900° F. The calcined pellets were then dipped for two hours in an equal volume of 5% boric acid, drained, and the treatment repeated with fresh boric acid of the same concentration; the temperature during these treatments was about 120°-160° F. The boric acid solution was drained from the pellets and the latter dried and heat treated at 1050° F. for two hours. The heat treated pellets were then dipped for ½ hour in a chloro-platinic acid solution of sufficient strength to give about 0.6% platinum on the finished catalyst, following which the pellets were dried at 200° F. and calcined at 1050° F. for two hours.

EXAMPLE II

Catalyst prepared as described in Example I was employed in the conversion of methylcyclopentane under the conditions and with the results shown in the following table:

*Table 1*

[Run conditions: 950° F.; 300 p. s. i. g.; $H_2$/oil (mols) 4—LSV (v./hr./v.), as reported.]

PRODUCTS

|  | At LSV=6 | At LSV=3 |
|---|---|---|
| Vol. percent $C_5^+$ | 92.6 | 93.6 |
| Vol. percent $C_4$ | 2.8 | 2.1 |
| Dry Gas, Wt. Percent | 2.1 | 1.2 |
| Percent Aromatics in $C_6^+$ | 34.4 | 36.6 |
| Conversion of naphthenes to Aromatics, Percent | 39.7 | 41.8 |

EXAMPLE III

Catalyst prepared as described in Example I was employed in the isomerization of normal heptane under the conditions and with the results shown below:

Table 2

[Run conditions: 950° F.; 600 p. s. i. g.; H₂/oil (mols) 4—LSV (v./hr./v.) 4.]

PRODUCTS

| Liquid Recovery, Vol. Percent | Iso C₇ Vol. Percent of Feed | Iso:Normal C₇ Mol Ratio |
|---|---|---|
| 76 | 35 | 1.0 |

EXAMPLE IV

Catalyst prepared as described in Example I was employed in reforming of an East Texas naphtha boiling over the approximate range of 190–370° F. and containing 13% aromatics and 48% naphthenes, under the conditions and with the results shown in the following table (reported at equal operating periods):

Table 3

[Run conditions: Temperature as reported.]

PRODUCTS

| | 950° F. | 925° F. | Charge |
|---|---|---|---|
| C₅+, Vol. Percent | 84.0 | 91.4 | |
| C₄, Vol. Percent | 12.2 | 7.6 | |
| Dry Gas, Wt. Percent | 3.2 | 1.6 | |
| Aromatics, Vol. Percent in C₅+ | 56 | 32 | |
| CFR-R (Clear) | 91.2 | 75.0 | 55 |
| Plus 3 cc. TEL | 97.7 | 87.8 | 77 |

In preparing the catalysts employed in accordance with the invention, it is important in order to obtain catalyst of desired activity and selectivity that the alumina be acid treated as described prior to impregnation with the boria.

From the foregoing examples it will be seen that the described catalyst can be advantageously utilized in the upgrading of charge stocks boiling in a range of gasoline and naphtha of various origin including typical naphthenic as well as highly paraffinic stocks, obtaining in either case good yields of motor or aviation gasoline of enhanced octane value. The catalysts are also useful in the production of aromatic compounds for use as industrial solvents or intermediates from alkylcyclopentane or from distillates concentrated in such naphthenes, as well as in the production of pure or highly concentrated iso-paraffin fractions for use in blending and for other purposes.

Obviously many modifications and variations of the invention as hereinbefore set forth may be made without departing from the spirit and scope thereof and only such limitations should be imposed as are indicated in the appended claims.

I claim as my invention:

1. A catalyst having activity for promoting isomerization and dehydrogenation of hydrocarbons, comprising 0.05–2.0% by weight platinum on an activated alumina which has been acid-treated with an organic carboxylic acid, said activated alumina also containing 0.1% to 5% by weight of boria.

2. The method of preparing hydrocarbon conversion catalyst which comprises treating activated alumina with aqueous carboxylic acid solution, washing with water, impregnating the alumina with boric acid in an amount sufficient to incorporate 0.1 to 5% boria therein, drying, and thereafter incorporating a small amount of a noble metal of the group consisting of platinum and palladium.

3. The method according to claim 2 wherein said acidic solution comprises aqueous acetic acid of 5–15% concentration.

4. The method of converting alkyl cyclopentanes to aromatic hydrocarbons which comprises subjecting a hydrocarbon charge of alkyl cyclopentanes to dehydroisomerization in the presence of a catalyst as defined in claim 1.

5. The method of isomerizing normal heptane and its higher homologues to corresponding branch chain hydrocarbons, which comprises subjecting such normal paraffins to contact with a catalyst as defined in claim 1 under isomerizing conditions including elevated pressure in the presence of excess hydrogen.

6. The method of upgrading gasoline and naphtha fractions which comprises subjecting such a fraction to contact with a halide-free catalyst comprising a minor quantity of a noble metal of the group consisting of platinum and palladium distributed in a carrier consisting of acid-treated alumina containing 0.1% to 5% boria, said contact being effected in the presence of excess hydrogen and under conversion conditions including temperatures in the range of about 850 to 1000° F. at superatmospheric pressure.

7. The method of converting alkyl cyclopentanes to aromatic hydrocarbons which comprises subjecting a hydrocarbon charge stock containing alkyl cyclopentane to catalytic dehydroisomerization in the presence of a halide-free catalyst comprising 0.05 to 2% platinum on a carrier composed of 0.1% to 5% boria on acid-treated activated alumina, said dehydroisomerization being effected in the presence of excess hydrogen and under pressure of 100–1000 lbs. per square inch.

8. The method according to claim 7 wherein said charge stock contains hydroaromatic compounds which are simultaneously dehydrogenated by said catalyst.

9. The method according to claim 7 wherein said dehydroisomerization is effected at a temperature of 850 to 1000° F. and under pressure of about 100–500 lbs. per square inch.

10. The method of converting normal heptane and its higher homologues to corresponding branch chain isomers, which comprises subjecting a hydrocarbon charge stock containing such a normal paraffin to isomerization conditions in the presence of a catalyst comprising 0.05 to 2% platinum on a carrier composed of 0.1% to 5% boria on activated alumina pretreated with aqueous carboxylic acid, said isomerization conditions includng temperature in the range of 850 to 1000° F. and under pressure of 400–700 lbs. per square inch.

11. The method of reforming gasoline and naphtha fractions in contact with a catalyst comprising a minor quantity of a noble metal of the platinum group distributed in a halide free support consisting essentially of activated alumina which has been treated with aqueous carboxylic acid solution and impregnated with 0.1% to 5% boria, said support being substantially free of alkali metal ions; said contact being effected at a temperature in the range of about 850 to 1000° F. and at superatmospheric pressure in the presence of added hydrogen.

12. The method according to claim 11 wherein said fraction contains C₇ and higher normal paraffins.

13. The method according to claim 11 wherein said fraction contains alkyl cyclopentanes.

References Cited in the file of this patent

UNITED STATES PATENTS

| | | |
|---|---|---|
| 1,338,709 | Sulzberger | May 4, 1920 |
| 2,407,918 | Burgin | Sept. 17, 1946 |
| 2,422,884 | Burgin | June 24, 1947 |
| 2,478,916 | Haensel | Aug. 16, 1949 |
| 2,611,749 | Haensel | Sept. 23, 1952 |
| 2,623,860 | Haensel | Dec. 30, 1952 |
| 2,625,504 | Haensel et al. | Jan. 13, 1953 |
| 2,667,461 | Guyer | Jan. 26, 1954 |